United States Patent
Shah et al.

(10) Patent No.: US 10,771,958 B2
(45) Date of Patent: Sep. 8, 2020

(54) CAPABILITY- AND USER-BASED PROFILE DOWNLOADS FOR NETWORKED DEVICES

(71) Applicant: T-Mobile USA, Inc., Bellevue, WA (US)

(72) Inventors: Mehul Shah, Sammamish, WA (US); Hamza Hydri Syed, Bothell, WA (US)

(73) Assignee: T-Mobile USA, Inc., Bellevue, WA (US)

(*) Notice: Subject to any disclaimer, the term of this patent is extended or adjusted under 35 U.S.C. 154(b) by 41 days.

(21) Appl. No.: 16/040,287

(22) Filed: Jul. 19, 2018

(65) Prior Publication Data

US 2018/0352422 A1 Dec. 6, 2018

Related U.S. Application Data

(62) Division of application No. 15/610,229, filed on May 31, 2017, now Pat. No. 10,057,761.

(51) Int. Cl.
*H04W 8/20* (2009.01)
*H04L 29/08* (2006.01)
*H04B 1/3816* (2015.01)
*H04W 8/18* (2009.01)

(52) U.S. Cl.
CPC .......... *H04W 8/205* (2013.01); *H04B 1/3816* (2013.01); *H04L 67/303* (2013.01); *H04M 2242/08* (2013.01); *H04W 8/183* (2013.01)

(58) Field of Classification Search
None
See application file for complete search history.

(56) References Cited

U.S. PATENT DOCUMENTS

| | | | |
|---|---|---|---|
| 2003/0081621 A1* | 5/2003 | Godfrey | H04L 67/2804 370/400 |
| 2008/0215665 A1 | 9/2008 | Appleby et al. | |
| 2015/0281964 A1 | 10/2015 | Seo et al. | |
| 2016/0088120 A1 | 3/2016 | Bala et al. | |
| 2016/0174065 A1* | 6/2016 | Li | H04W 8/205 455/419 |
| 2016/0295544 A1* | 10/2016 | Jiang | H04L 5/0053 |
| 2017/0149686 A1 | 5/2017 | Marshall et al. | |
| 2017/0195415 A1 | 7/2017 | Versteeg et al. | |
| 2017/0201850 A1* | 7/2017 | Raleigh | H04W 4/50 |
| 2017/0230939 A1* | 8/2017 | Rudolf | H04L 12/1863 |

(Continued)

*Primary Examiner* — Ajit Patel
(74) *Attorney, Agent, or Firm* — Lee & Hayes, P.C.

(57) ABSTRACT

Systems and methods for providing greater granularity and updatability to network profiles. The system can include a subscription management application program interface (SMA) to receive setup information, user preferences, software, hardware, and firmware updates from a user cell phone, computer, or smart device (collectively, end-point) regarding what features the user wishes to access. The SMA can access a profile lookup table to identify a profile with the requested attributes. A subscription management module (SMM) can receive this information from the SMA and retrieved the profile requested by the SMA from a repository of profiles. The SMM can then download or activate the profile with features that match, or most closely match, the requested features onto the end-point. The system can enable providers to ship phones with no network profiles. The system can also enable profiles to be updated based on changes in user preferences, updates, or other changes.

15 Claims, 7 Drawing Sheets

(56) References Cited

U.S. PATENT DOCUMENTS

2017/0279829 A1   9/2017  Vasseur et al.
2018/0131699 A1*  5/2018  Park ..................... H04W 12/06
2018/0139602 A1*  5/2018  Chastain ................ H04W 8/26
2018/0160292 A1*  6/2018  Chastain ................ H04W 8/18
2019/0327605 A1* 10/2019  Fan ................... H04W 12/0023

* cited by examiner

CAPABILITY- AND USER-BASED PROFILE DOWNLOADS FOR NETWORKED DEVICES

CROSS-REFERENCE TO RELATED APPLICATION

This application is a divisional of and claims priority to U.S. patent application Ser. No. 15/610,229, filed May 31, 2017, which is herein incorporated by reference in its entirety.

BACKGROUND

A plethora of devices are now capable of accessing one or more networks for a variety of reasons. Cellular devices such as, for example, smart phones, tablet and laptop computers, and smart watches can access cellular and internet protocol (IP) networks to provide voice, data, messaging, and other services. Other devices, such as smart power meters, parking meters, and pet trackers, for example, can also be connected to various data networks to provide reporting, receive updates, etc. Indeed, the so-called "Internet of Things" (or, IoT) can include refrigerators, thermostats, water heaters, and other everyday devices that are also connected to one or more networks for updates, support, remote control services, and other purposes.

Traditionally, cellular network profiles generally fell into two categories—machine-to-machine (or, "M2M") and consumer. M2M includes devices like the aforementioned smart power meters, parking meters, pet trackers, etc. Consumer devices, on the other hand, include cellular phones, smart phones, and tablet and laptop computers, among other things. Thus, an M2M device—with an M2M network profile—may be given access only to data and smart messaging service (SMS), for example, while a consumer device—with a consumer network profile—can be given access to voice, SMS, data, video, rich messaging, and other features on the network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
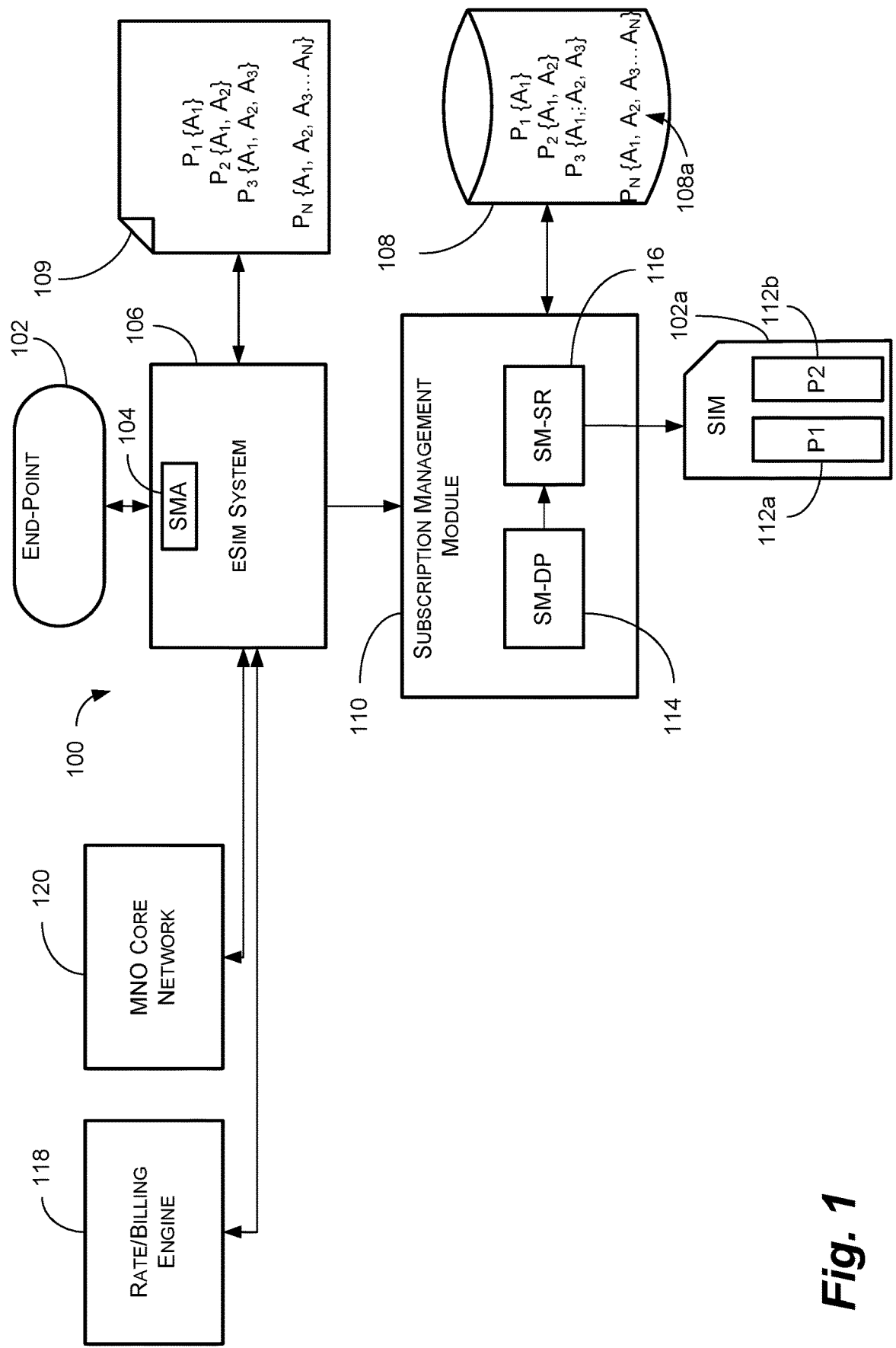
FIG. 1 depicts an embedded subscriber identification module (eSIM) system with improved functionality, in accordance with some examples of the present disclosure.

Examples of the present disclosure can comprise systems and methods to provide customizable network profiles based on user preferences, device capabilities, or a combination thereof. The system can include a network subscription management module and a database of network profiles. The system can provide initial network setup, periodically update network profiles, and create profiles based on user input. The system provides greater flexibility and customization for a variety of network-connected devices.

To simplify and clarify explanation, the system is described below for use with a device connected to cellular data (e.g., mobile internet protocol, or "IP") and/or cellular voice networks. One of skill in the art will recognize, however, that the system could also be used for other types of networks such as, for example, cable, digital subscriber line (DSL), and fiber IP networks. Thus, the system can be used anytime a device needs one or more profiles to connect to a network.

As mentioned above, due to the proliferation of network-connected devices, the two typical network profiles are no longer sufficiently granular. In addition, many devices are user configurable and updatable. As the functionality of the device changes, therefore, it may be desirable to add or remove features. A user may choose to add a feature to a device that was previously not active or remove a feature to save money or data, for example.

Electronic Subscriber Identity Module (eSIM) is an industry standard whereby a profile from a carrier, such as a mobile network operator (MNO), can be securely downloaded to an embedded or removable subscriber identification module (SIM) card to enable the end-point (e.g., cell phone, smart meter, etc.) to access the MNO's network and access network functions such as voice, messaging and data. The conventional approach is to follow the industry standard and create two profiles on the network catering to the aforementioned two broad categories of devices, namely M2M (smart meters, sensors, pet trackers etc.) and consumer (smartphones, wearables etc.).

Once these profiles are defined, access is controlled by provisioning appropriate functions on the network nodes. An end-point such as a smart-meter, for example, may be given an M2M profile that only enables data and SMS functions on the network. A consumer device such as, for example, a cell phone, smart phone, or smart watch, on the other hand, may be enabled to access voice, messaging, and data on the network.

An end-point that is programmable or whose functions can be changed via a software upgrade or user input, for example, needs a more flexible approach as far as profile selection is concerned. In other words, the MNO may need to provide more than the two basic profile types to provide further control over various function. In addition, the MNO may need to update profiles dynamically in response to changes on the device.

The end-point (e.g., a cell phone) may be shipped from the MNO to the user with no profile, for example. This can enable the MNO to stock a single phone of that type, for example, rather than stocking multiple phones with different profiles. When received, the end-user can then select from a set of available capabilities of the device, which are then transmitted to the MNO. Because the MNO has a repository of available profiles—as opposed to just two—the MNO can then match device capabilities and/or the set of selected end-user preferences with a profile from the repository, which suits the particular needs of the device or end-user. The selected profile can then be downloaded to the end-point to activate the end-point on the network.

As shown in FIG. 1, the system 100 can comprise an end-point 102, a subscription management application program interface (SMA) 104, an embedded subscriber identification module (eSIM) system 106, a profile repository 108, a profile lookup table 109, a subscription management module (SMM) 110. As discussed above, the end-point 102 can comprise a variety of network-enabled devices. The end-point 102 can comprise a number of communications devices such as, for example, a cell phone, smart phone, tablet computer, laptop computer, or smart watch. The end-point 102 can also include a number of other network enable devices such as, for example, refrigerators, thermostats, and washing machines (the so-called, "Internet of Things"). Indeed, the end-point 102 can be any device capable of connecting to any type of network—e.g., cellular networks, IP networks, Wi-Fi connections, Bluetooth®, etc.—that utilize profiles to access various functions.

The end-point 102 can also include a SIM 102a. The SIM 102a can comprise an embedded (e.g., eSIM) or removable SIM and can be remotely configurable via the eSIM system 106 (via the SMA 104). The SIM 102a includes various information (e.g., the international mobile subscriber identity, or IMSI) that enables the end-point 102 to access the MNO's network. In some examples, the SIM 102a can include multiple profiles 112 with different profile attributes 108a. So, for example, a first profile 112a may enable the end-point 102 to access text messaging only, while a second profile 112b may enable the end-point 102 to access voice services only. In this manner, if the user wishes to change the capabilities of the end-point 102, for example, the first profile 112a can be swapped for the second profile 112b, or vice-versa, without the need to download additional profile from the eSIM system 106.

The system 100 can also comprise the SMA 104. The SMA 104 can comprise an application program interface (API) to enable communications between the end-point 102 and the eSIM system 106 and to facilitate eSIM updates as discussed below with reference to FIGS. 3A-3C. The SMA 104 can comprise a plurality of APIs including, for example, Javascript Object Notification (JSON) based RESTful APIs, among other things. In FIG. 1, the SMA 104 is shown stored on the eSIM system 106, which is one possible configuration. One of skill in the art will recognize, however, that the SMA 104 could also be stored on the end-point 102, a cloud storage device, or other remote server.

The system 100 can also include the eSIM system 106. The eSIM system 106 can include one or more "back-end" devices, generally associated with the MNO. As mentioned above, eSIM is an industry standard whereby a profile 112 can be securely downloaded to an embedded or removable SIM 102 such that the end-point 102 can access the MNO's network and access network functions such as voice, messaging, and data. The eSIM system 106 can also enable dynamic profile 112 updates to add or remove features available to the end-point 102.

The system 100 can also include a profile repository 108. As mentioned above, rather than having the standard two profiles (consumer and M2M), the profile repository 108 can include a plurality of profiles 112, each catered to a specific group of functions, wherein each function is associated with a profile attribute 108a. This can enable users to pick and choose the functions to which they would like to have access. A user may choose to have text messaging available on his cell phone, for example, but not on his refrigerator (though it is available) to save money, for example, and/or reduce data usage, among other things. Indeed, a user may have multiple end-points 102 (e.g., a cell phone, laptop, and refrigerator) each with a different profile. The profile repository 108 can comprise a database of profiles 112 and can be stored on a server associated with the SMM 110, a cloud storage device, or other remote server.

The system 100 can also include a profile lookup table 109. Thus, while the actual profiles 112 can be stored in the profile repository 108, the eSIM system 106 can maintain the profile lookup table 109 including a list of profiles 112 and their profile attributes 108a. In other words, the profile lookup table 109 can comprise a database of profile attributes 108a (or codes associated with profile attributes 108a) for each type of profile 112, but not the profiles 112 themselves. As discussed below, the eSIM system 106 can compare a profile requested by the SMA 104, for example, to the available profiles 112 in the profile lookup table 109 and then request the selected profile 112 from the SMM 110. The selected profile 112 can include at least the functions (or, profile attributes 108a) in the requested profile.

The system 100 can also include the SMM 110. The SMM 110 can prepare, encrypt, and send the profiles to the eSIM system 106 and/or directly to the end-point 102. The SMM 110 can receive profile requests from the eSIM system 106, for example, and then retrieve profiles 112 from the profile repository 108 for download to the eSIM system 106 (and ultimately, the end-point 102). In some examples, as shown the SMM 110 can include subscription manager data preparation (SM-DP) 114 and a subscription manager secure routing (SM-SR) 116. The SM-DP 114 can securely create and encrypt profiles 112 and can securely install the profiles 112 onto the SIM 102a. To this end, the SM-DP 114 can securely package profiles 112 to be provisioned on the SIM 102a using, for example, profile packages like those standardized by the SIM Alliance. See, e.g., "SIMalliance eUICC Profile Package: Interoperable Format Technical Specification V2.0", SIMAlliance, Ltd. (2016) available at http://simalliance.org/euicc/euicc-technical-releases/#. The SM-DP 114 can also manage the installation of these profiles 112 onto the SIM 102a. In addition, a procedure between the MNO and the SM-DP 114 can allow a profile 112 previously downloaded and installed on the SIM 102a to be enabled on the MNO's network.

The SM-SR 116 enables the secure download, enablement, disablement, and deletion of profiles 112 on the SIM 102a. Thus, the SM-SR 116 ensures the secure transport of both SIM platform and SIM profile management commands to load, enable, disable, and delete profiles 112 on the SIM 102a. Thus, the SM-SR 116 may download a new profile 112 to the end-point 102 or, when the requested profile 112 already exists on the end-point, deactivate one profile 112 and activate another profile 112.

In some examples, the system 100 may also receive inputs from a rate/billing engine 118. The rate/billing engine 118 can be associated with the MNO and can provide input as to whether, for example, a user's account includes the features requested for the end-point 102. If the SMA 104 requests a profile 112 that enables a user's refrigerator to receive text messages, for example, but the user's account does not include text messaging, the eSIM system 106 or the SMA 104 may generate an error message, prompt the user to upgrade their account, or take other actions.

The system 100 can also be connected directly, or indirectly, to the MNO core network 120. The MNO core network 120 comprises the central portion of the MNO's network and can provide access to cellular and IP services. A cellular connected end-point 102 may be connected to a cell tower, for example, which can be connected to the MNO core network 120 via, for example, one or more fiber optic connections, microwave backhauls, switching centers, etc. An IP connected end-point 102 may be connected, for example, through a wireless (e.g., Wi-Fi) connection, to a cable internet service provider (ISP), and ultimately to the Internet.

In some examples, the system 100 can enable various end-points 102 (e.g., a cell phone, refrigerator, or other network enabled device) to be shipped with no profile 112. The end-user can then select from a set of available capabilities of the end-point 102, which are then transmitted to the MNO. The MNO may want to match end-point 102 capabilities and/or the set of selected end-user preferences with profiles 112 stored in the profile repository 108. The system 100 can select the best profile 112 based on the particular needs of the end-point 102 or end-user and then download it to the end-point 102. The system 100 can enable the MNO to sell a basic universal plan to the customer at the POS, but then give users the freedom to pick and choose services according to their needs and the capabilities of the end-point, for example, after switching devices, or acquiring new network enabled devices.

Figure 2A:
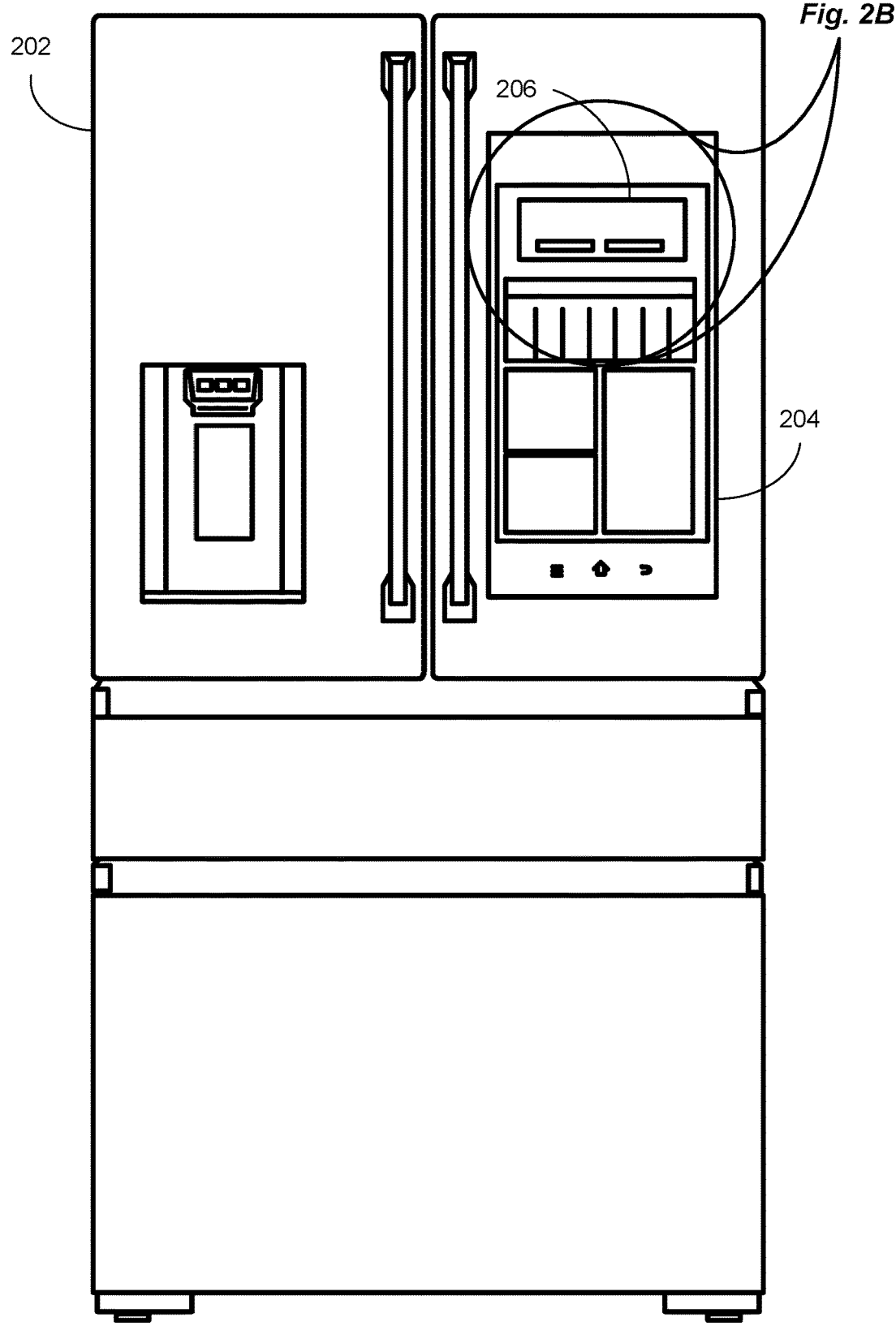
FIGS. 2A and 2B depict a network-enabled refrigerator with a graphical user interface (GUI), in accordance with some examples of the present disclosure.
Figure 2B:
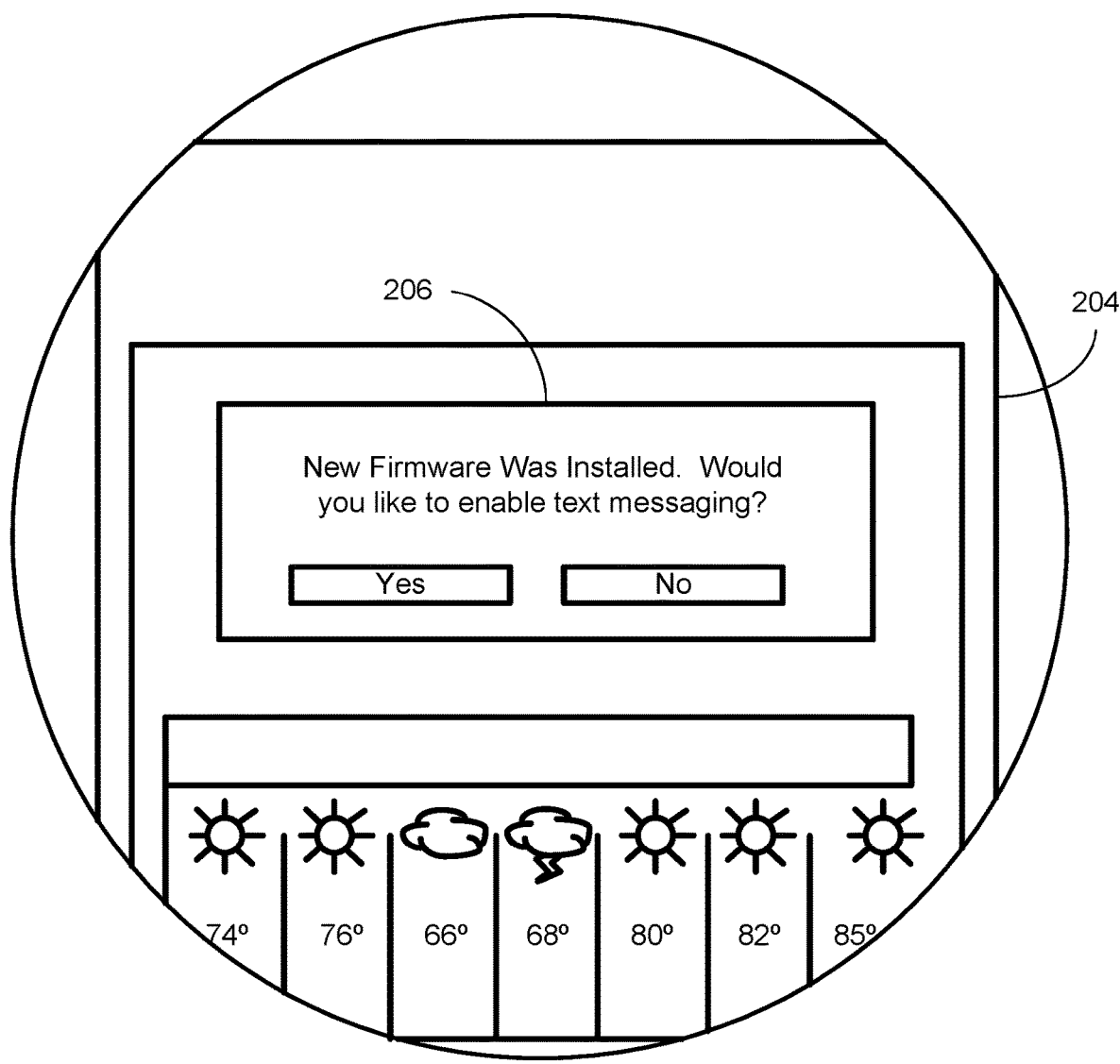

As shown in FIGS. 2A and 2B, if a user purchases a network-enabled refrigerator 202, for example, the user may wish to use certain features and not use others. To this end, the refrigerator 202 can include a device to accept user-input, such as a touchscreen 204, keyboard, menu buttons, or other input. In some examples, the touchscreen 204 can include a graphical user interface (GUI) 206 to solicit and receive input from the user. In this manner, the refrigerator 202 can ship with no carrier profile, or a generic profile. This can enable manufacturers and/or retailers to stock a single stock item, for example, which can reduce costs and complexity.

Upon initial setup, the user can connect the refrigerator 202 to a cellular or Wi-Fi connection, for example, at the user's home or work (i.e., wherever the refrigerator 202 is located). The user can then be presented with an option (e.g., on the touchscreen 204) to select an MNO for providing network connectivity to the refrigerator 202.

After the refrigerator 202 is connected to the appropriate network, the user can be prompted on the touchscreen 204 by an internal setup program, or a setup program provided over the network, to select the desired functionality from a set of available functions. The user may wish to download recipes from the Internet (data access), for example, send and receive text messages (messaging access), link the refrigerator 202 to his/her online grocer account for ordering groceries, and/or display photos from a shared computer or cloud hosting solution (authentication certificates may be needed in the SIM profile for cloud IoT access). The attributes selected by the user can then be transmitted to the MNO.

Changes in the attributes associated with the refrigerator 202 could also be the result of an update to the refrigerator 202—e.g., new firmware or software that adds capabilities. Changes in the attributes associated with the refrigerator 202 could also be the result of a user activating or deactivating features on the refrigerator 202. A user may wish to add text messaging at a later date, for example, despite the fact that he did not select this function at initial setup. A user may also wish to disable internet access due to data limits associated with a cellular rate plane, for example, or because of small children in the house, among other things.

Regardless of the genesis of the change, the eSIM system 106 can select the appropriate profile 112 from the profiles 112 listed in the profile lookup table 109. The SMM 110 can then securely download the profile 112 to the SIM 102a in the refrigerator 202, as discussed above. Network provisioning can be done either sequentially or concurrently to the profile 112 download.

Figure 3A:
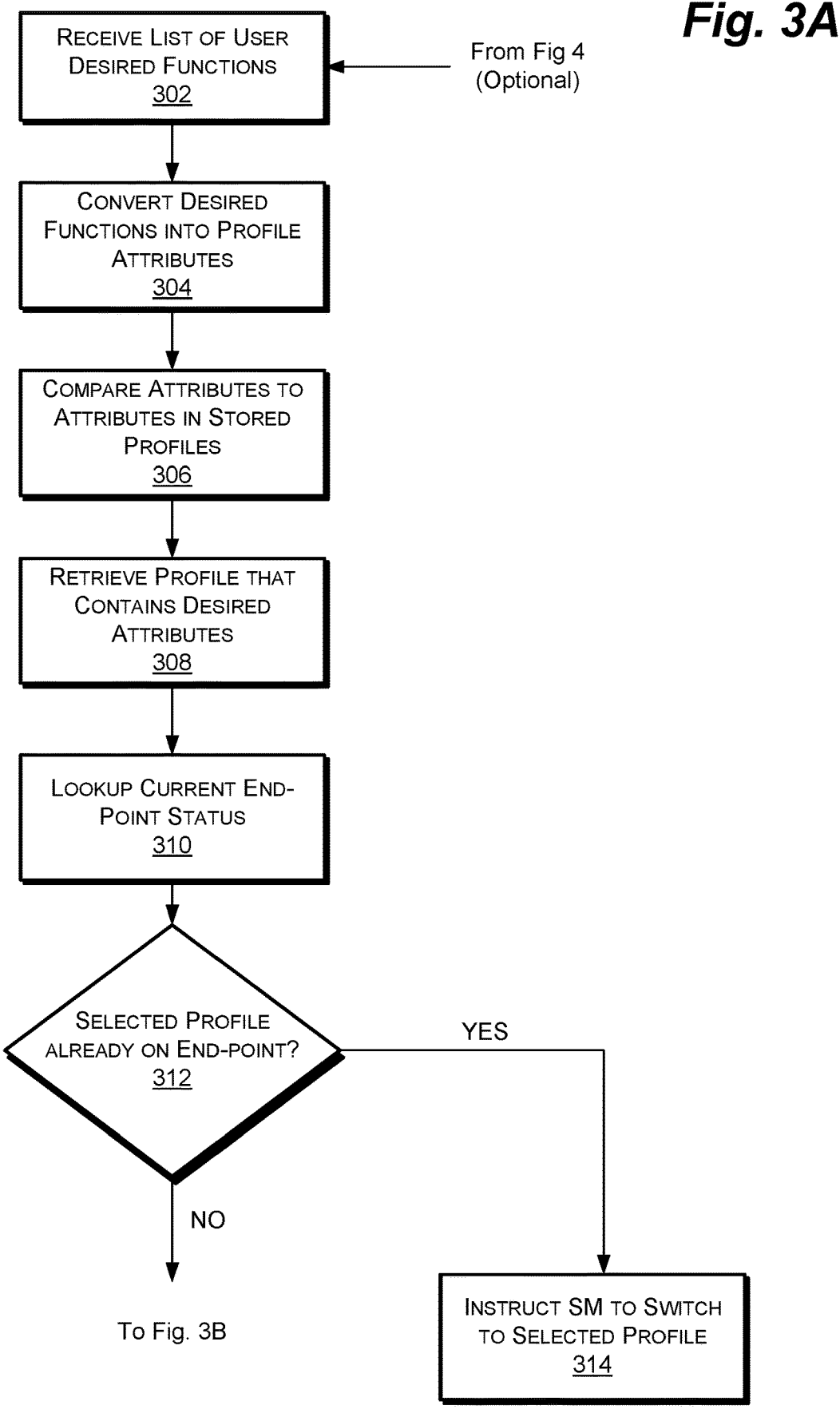
FIGS. 3A and 3B depict an example of a method for updating a SIM on an end-point, in accordance with some examples of the present disclosure.
Figure 3B:
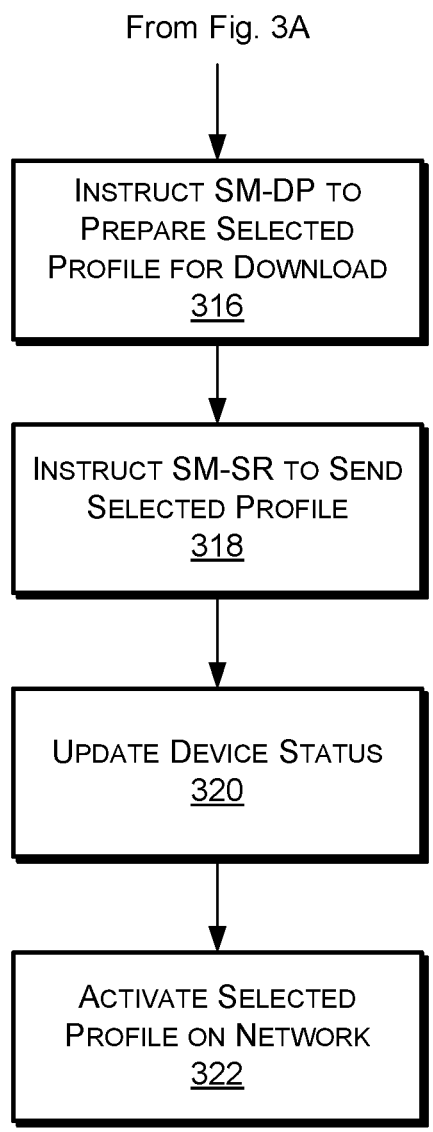

FIGS. 3A and 3B depict an example method 300 for profile 112 selection that is implemented in the eSIM system 106, based on the above use-case. An enhancement of the framework could potentially include setting up a listener process (FIG. 4) that is invoked by a firmware management platform (e.g., firmware over-the-air, or FOTA) on the MNOs network such that the SMA 104 is notified of any firmware upgrades to the end-point 102. As discussed above, the end-point 102 could be upgraded through firmware to support additional network access functions (e.g., the refrigerator 202 could be upgraded via software to support voice communication capabilities, post-sale, etc.). The SMA 104 can then send a signal to the SMM 110 to display the GUI 206 to the end-user (e.g., on the touchscreen 204) to accept the newly enabled function.

If the end-user accepts the new function, the SMA 104 then proceeds to match selected attributes with the profiles 112 listed in the profile lookup table 109 (and available in the profile repository 108. The eSIM system 106 then either selects a profile 112 on the SIM 102a—if a suitable profile already exists on the SIM 102a—or downloads a new profile 112 to the SIM 102a via the SMM 110. If the end-user decides not to enable the new function(s) (i.e. the user dismisses the graphical prompt on the touchscreen 204), on the other hand, no messaging to the network or change in profile 112 is necessary. Of course, in some examples, new function(s) may be added automatically without input from the user.

Regardless, as shown in FIG. 3A, at 302, the method 300 can include receiving at the eSIM system 106 (e.g., at the SMA 104) a request for a profile 112 with a list of desired functions from the end-point 102. As mentioned above, this can be provided by the user via one or more inputs on the end-point 102, for example, provided by the end-point 102 as part of an automatic upgrade system, or provided by the FOTA. In some examples, the SMA 104 can receive a complete list of all functions. In other examples, the SMA 104 can receive a list comprising only the new functions requested. In other words, the SMA 104 or the eSIM system 106 already has a list of the end-points 102 current capabilities and only requires the requested new functions.

At 304, the eSIM system 106 can convert the desired functions into profile attributes 108a. In some examples, the profiles 112 can include data structures that map various functions to various profile attributes 108a. As shown in FIG. 1, for example, each profile 112 can contain one or more profile attributes 108a (e.g., $A_1, A_2, A_3$, etc.), which are each associated with a particular function. $A_1$ can be associated with data access, for example, $A_2$ can be associated with messaging access, and $A_3$ can be associated with cloud IoT access. Of course, these assignments are completely arbitrary and could be different or include different categories, among other things.

At 306, the eSIM system 106 can compare the profile attributes 108a provided above to the list of profiles 112 listed in the profile lookup table 109 and associated with the profiles 112 stored in the profile repository 108. In this manner, the eSIM system 106 can identify a profile 112 that includes at least the profile attributes 108a requested by the end-point 102. In some examples, a particular profile 112 can include exactly the profile attributes 108a requested. So, for example, if the refrigerator 202 is requesting only data access, Profile 1 ($P_1$) includes just data access ($A_1$). Due to the number of possible combinations and permutations, however, it may not be practical to have a specific profile 112 for each combination. An end-point 102 may request data access ($A_1$) and cloud IoT access ($A_3$) only, for example, but the only profile 112 ($P_3$) than includes both profile attributes 108a ($A_1$ and $A_3$) also includes messaging access ($A_2$).

In some examples, after a predetermined number of requests for a profile 112 with a particular set of profile attributes 108a is requested with no exact profile match (e.g., a profile 112 with excess profile attributes 108a is required, the eSIM system 106 may initiate a process to create a new profile 112. In other words, if a significant number (e.g., 100; 1,000; or 10,000) of profile requests include $A_1$ and $A_3$, but, as mentioned above, the closest profile 112 ($P_3$) includes $A_1$, $A_2$, and $A_3$, the eSIM system 106 may send a request to create a new profile 112 (e.g., $P_4$) that includes only $A_1$ and $A_3$. In this manner, over time, profiles 112 are created that match the profiles requests from users.

At 308, the eSIM system 106 can send a request to retrieve the profile 112 identified in the profile lookup table 109 from the profile repository 108. Thus, the eSIM system 106 can identify the profile entry in the profile lookup table 109 that includes the requested profile attributes 108a and then determine whether an existing profile 112 can be used or if a new profile 112 needs to be requested.

At 310, the eSIM system 106 can determine the status of the current profile(s) 112 on the end-point 102. In other words, it is possible that the end-point 102 already contains the necessary profile 112 and this profile 112 merely needs to be activated. If not, the eSIM system 106 can request an appropriate profile 112 from the SMM 110, as discussed below. Information associated with the current profile 112 may be provided by the end-point 102, the SMA 104, the SMM 110, the profile lookup table 109, or may be included in a separate lookup table stored by the MNO.

At 312, the eSIM system 106 can determine if an appropriate profile 112 is already stored on the end-point 102. As mentioned above, the SIM 102a may already include two or more different profiles 112. Thus, an end-point 102 may currently be using a first profile 112a that does not include all of the requested profile attributes 108a, but a second profile 112b that does include all of the requested profile attributes 108a does.

On the other hand, the end-point 102 may be downgrading. In other words, the end-point 102 may be requesting a profile 112 with less profile attributes 108a due to the user deactivating a particular function. A user may wish to remove messaging from the refrigerator 202, for example, due to message restrictions on his cellular plan. In this manner, the system 100 may be able to revert to a previous profile 112 already stored on the SIM 102a.

At 314, if an appropriate profile 112 is already stored on the SIM 102a, the eSIM system 106 can send instructions to the SMM 110 to switch the end-point 102 from the current profile (e.g., the first profile 112a) to the stored profile (e.g., the second profile 112b). This may include sending a signal from the eSIM system 106 to the SMM 110, for example, to deactivate the first profile 112a and activate the second profile 112b. The SMM 110, in turn, can send the appropriate signal to the end-point to make the switch.

At 316, as shown in FIG. 3B, if, on the other hand, a profile 112 with the requested features is not stored on the SIM 102a, the eSIM system 106 can request the appropriate profile 112 from the SMM 110. Upon receiving the request, the SMM 110 can begin the preparation and downloaded process for an appropriate profile 112. In some examples, the SMM 110 can instruct the SM-DP 114 to prepare the selected profile 112 for download. As mentioned above, this can include preparing the profile 112 for transmission to the end-point 102, among other things. In some examples, the functions of the SM-DP 114 can be configured according to GSMA Remote Provisioning Technical Specification [GS RPT] or other suitable specification.

At 318, the SMM 110 can download the profile to the end-point 102. In some examples, this can include the eSIM system 106 sending a request to the SMM 110 and the SMM 110 sending instructions to the SM-SR 116 to send the selected profile 112 to the end-point 102. If necessary, this can include deleting one or more profiles 112 stored on the SIM 102a to make room for the new profile 112. The SM-SR 116 can also send instructions to the SIM 102a to activate the new profile 112.

At 320, the SMM 110 can update the status of the end-point 102 on the network. In some examples, the eSIM system 106 can also send instructions to the rate/billing engine 118 to update the status of the end-point 102. In some examples, this may include activating or deactivating the functions associate with the new profile 112. If the user is adding messaging to the refrigerator 202, for example, the refrigerator 202 may need to be authorized on the MNO to enable text messaging and billing.

At 322, the SMM 110 can activate the new profile 112 on the network. In some examples, this can include the eSIM system 106 or the rate/billing engine 118 activating the profile 112 to enable the end-point 102 to access the desired functions on the MNO core network 120.

Figure 4:
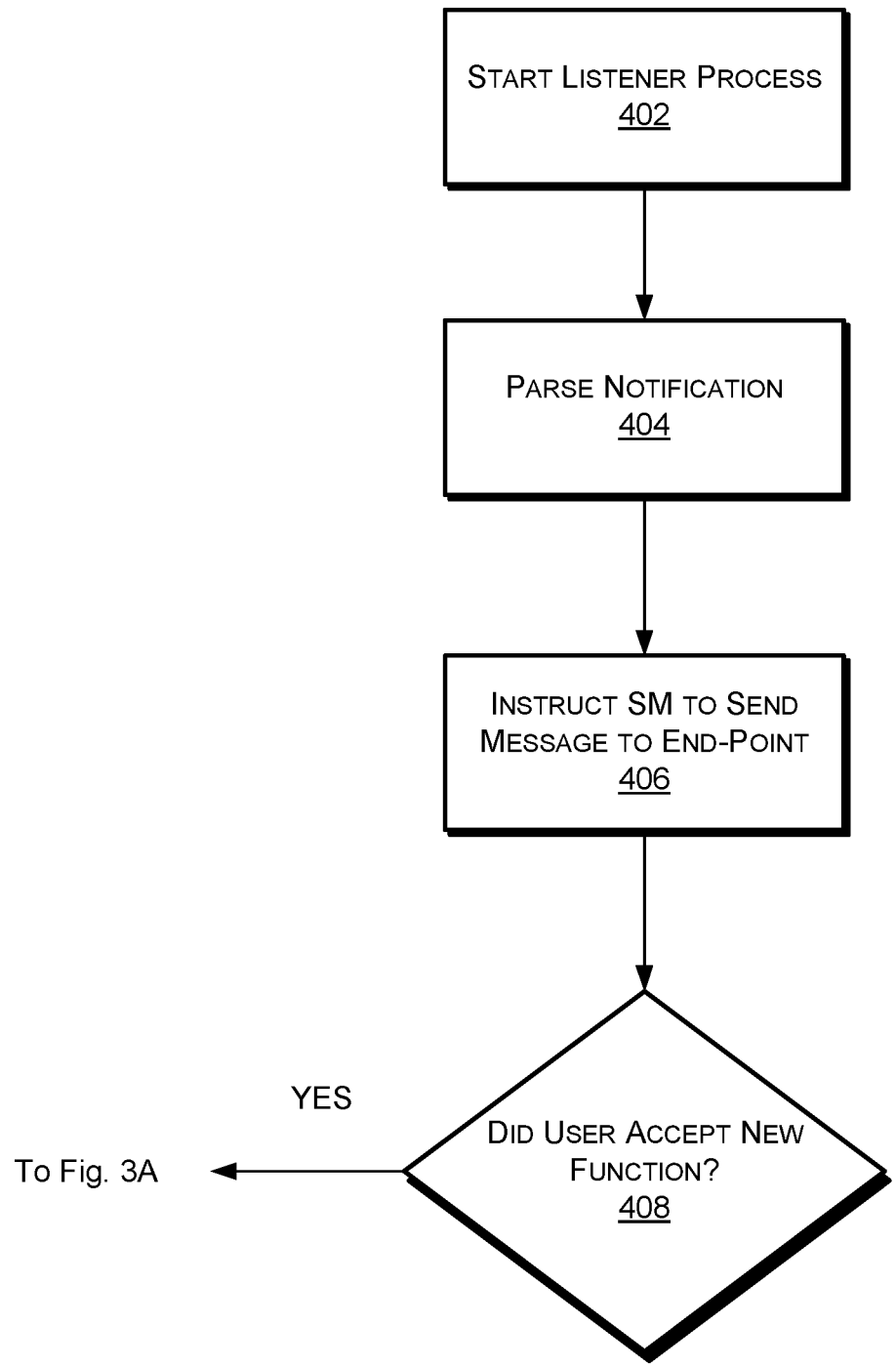
FIG. 4 depicts an example of a method for using a listener process to automatically update a SIM on an end-point, in accordance with some examples of the present disclosure.

As shown in FIG. 4, in some examples, the system 100 can also include a method 400 for "listening" for updates and automatically updating profiles 112 as necessary. In this configuration, if the end-point 102 receives a firmware or software update, for example, that enables new features on the end-point 102, the eSIM system 106 via the SMA 104 can automatically initiate the profile update method 300, discussed above.

At 402, the eSIM system 106 can start the listening process. This can include the SMA 104, for example, detecting a notification from a FOTA system or a software update system associated with the end-point 102. So, for example, a software update for the above-mentioned refrigerator 202 can enable text messaging ($A_2$) in addition to the previously available data access ($A_1$). Thus, the refrigerator 202 may need a new profile 112 or, at the least, to switch to a different profile 112.

At 404, the eSIM system 106 can parse the notification from the FOTA (or other entity) into its constituent parts, or profile attributes 108a. The notification can include addressing information, software, firmware, and other data some of which implicate new functions and others that do not. The message may also include version numbers, dates, and other information relevant to the update.

At 406, the eSIM system 106 can determine if new functions are required by any portion of the update. In some examples, the update may merely update existing software or firmware without adding new functionality. In other examples, the update may configure a previously unconfigured end-point, as discussed above, which may or may not add new functions. In still other examples, the update may include new functions or activate previously unused functions. If no new functions are implicated, no additional steps are required.

At 408, if new functions are available, on the other hand, the eSIM system 106 can send a message to the end-point 102 to display an acceptance prompt. In some examples, the SMA 104 or eSIM system 106, for example, can prompt the SMM 110 to send a message to the end-point 102. The message can cause the end-point 102 to solicit input from the user in some way. As discussed above, the end-point 102 may display a prompt on a touchscreen 204, for example, provide an audio message, or otherwise prompt the user for a selection.

At 410, if the user declines the new function, no further action is required. If, on the other hand, the user accepts the new functionality, the eSIM system 106 can initiate the method 300 for determining whether an updated profile 112 is required or if an existing profile can be activated. In some examples, this can entail simply activating a profile 112 already stored on the end-point. In other examples, this can entail retrieving a new profile 112 from the profile repository 108 and downloading it to the end-point 102.

FIGS. 3A, 3B, and 4 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described should not be construed as a limitation, and any number of the described blocks can be combined in any order and/or in parallel to implement the processes.

Figure 5:
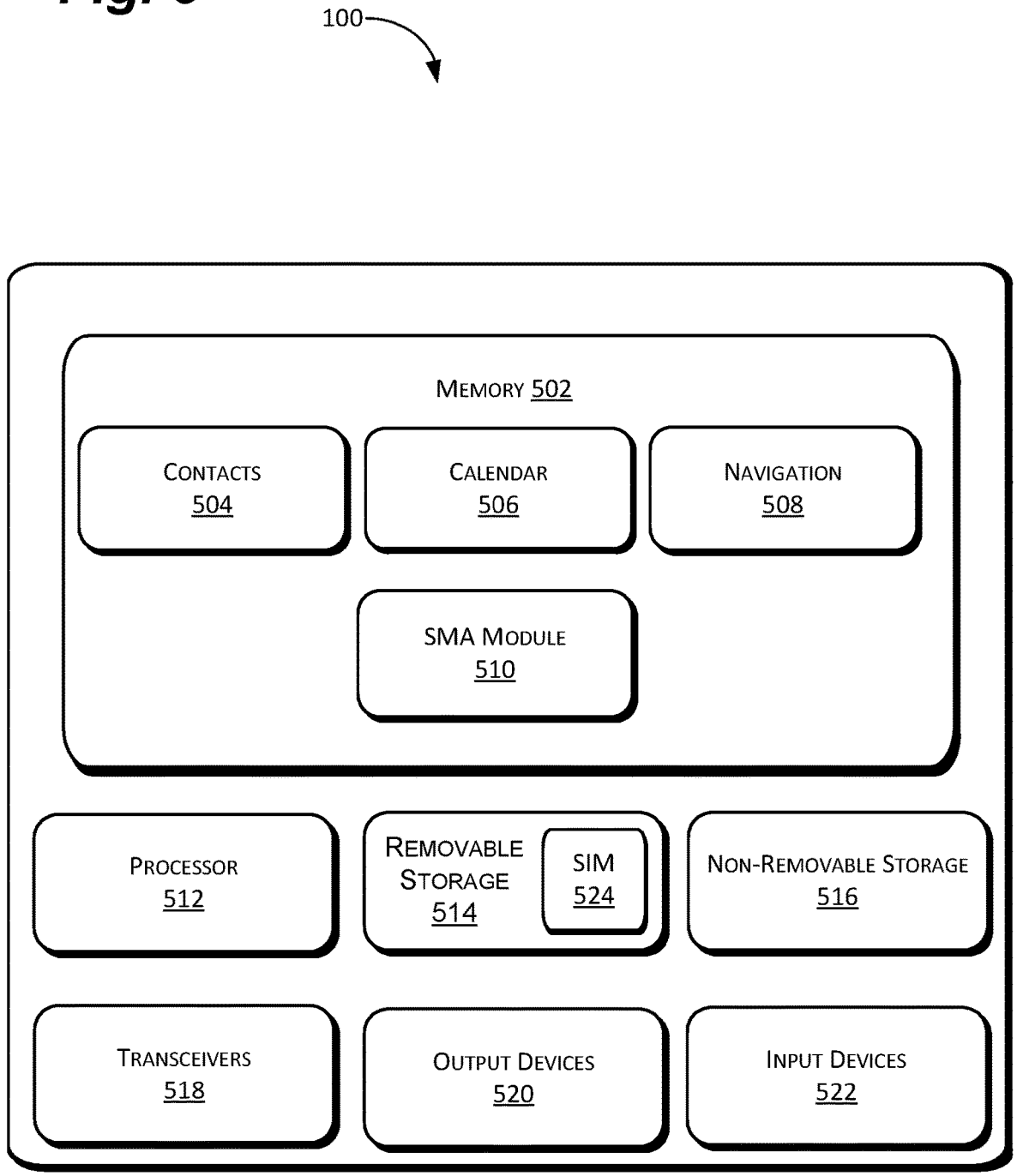
FIG. 5 depicts an example of an end-point for use with the improved eSIM system, in accordance with some examples of the present disclosure.

As shown in FIG. 5, the system 100 and methods 300, 400 can be implemented in conjunction with a variety of electronic devices, such as cell phones, smart phones, tablet computers, laptops, and IoT devices (e.g., refrigerators 202, thermostats, and other devices), which are referred to above collectively as end-points 102. The end-points 102 can comprise a number of components to perform the above-mentioned functions. As discussed below, the end-points 102 can comprise memory 502 including many common features such as, for example, the contacts 504, calendar 506, navigation software 508, and an SMA module 510. The end-points 102 can also include one or more processor(s) 512, removable storage 514, non-removable storage 516, transceiver(s) 518, output device(s) 520, and input device(s) 522. In some examples, such as for cellular communication devices, the end-points 102 can also include the SIM 102a including the International Mobile Subscriber Identity (IMSI), among other things. In some examples, some, or all, of the functions associated with the system 100 and methods 300, 400 can also be handled by a remote server or other remote network entity.

In various implementations, the memory 502 can be volatile (such as random access memory (RAM)), non-volatile (such as read only memory (ROM), flash memory, etc.), or some combination of the two. The memory 502 can include all, or part, of the SMA 104, for example, the functions 504, 506, 508, 510 and an operating system (OS) for the end-points 102, among other things.

The memory 502 can also comprise contacts 504. The contacts 504 can include names, numbers, addresses, and other information about the user's business and personal acquaintances, among other things. In some examples, the memory 502 can also include a calendar 506, or other software, to enable the user to track appointments and calls, schedule meetings, and provide similar functions. In some examples, the memory 502 can also comprise navigation software 508 such as global positioning system (GPS) and/or cellular location based navigation systems. Of course, the memory 502 can also include other software such as, for example, text messaging, social media, and utilities (e.g., calculators, clocks, compasses, etc.).

The memory 502 can also comprise an SMA module 510 to enable the SMA 104 to communicate with the end-point 102 and/or to provide data to the eSIM system 106. So, for example, the SMA module 510 can comprise one or more software components in communication with the end-point 102 and the SMA 104. The SMA module 510 can provide information about the current profile 112 profile attributes 108a, for example, and the status of the end-point including, for example, the memory 502 available on the end-point 102 (e.g., to ensure there is enough storage space for a new profile 112), whether the end-point 102 is connected to the network, etc.

The end-points 102 may also include additional data storage devices (removable and/or non-removable) such as, for example, magnetic disks, optical disks, or tape. Such additional storage is illustrated in FIG. 5 by removable storage 514 and non-removable storage 516. The removable storage 514 and non-removable storage 516 can store some, or all, of the various programs 504, 506, 508, 510 and methods 300, 400. This can enable the end-points 102 to be fully, or partially, configured and to enable the systems 100 and methods 300, 400 to present welcome screens, setup menus, GUIs, and other functions to the user via the system 100 and methods 300, 400, OS, and other programs and functions.

Non-transitory computer-readable media may include volatile and nonvolatile, removable and non-removable tangible, physical media implemented in technology for storage of information, such as computer readable instructions, data structures, program modules, or other data. The memory 502, removable storage 514, and non-removable storage 516 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the end-points 102. Any such non-transitory computer-readable media may be part of the end-points 102 or may be a separate database, databank, remote server, or cloud-based server.

In some implementations, the transceiver(s) 518 include any sort of transceivers known in the art. In some examples, the transceiver(s) 518 can include wireless modem(s) to facilitate wireless connectivity with the other UEs, the Internet, and/or an intranet via a cellular connection. Further, the transceiver(s) 518 may include a radio transceiver that performs the function of transmitting and receiving radio frequency communications via an antenna (e.g., Wi-Fi or Bluetooth®). In other examples, the transceiver(s) 518 may include wired communication components, such as a wired modem or Ethernet port, for communicating with the other UEs or the provider's Internet-based network.

In some implementations, the output device(s) 520 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the end-points 102 is connected to a network, the type of call being received (e.g., video calls vs. voice calls), the number of active calls, etc. Output device(s) 520 also include ports for one or more peripheral devices, such as headphones, peripheral speakers, or a peripheral display.

In various implementations, input device(s) 522 include any sort of input devices known in the art. For example, the input device(s) 522 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

In some examples, particularly for cellular enabled devices, the end-points 102 can removable storage 514 can include a SIM 102a. As usual, the SIM 102a can store the users IMSI for identification, and other pertinent data, for communication over one or more cellular networks. In some cases, the some or all of the contacts 504 can also be stored in the SIM 102a.

While several possible examples are disclosed above, examples of the present disclosure are not so limited. For instance, while the systems and methods above are discussed with reference to use with cellular data and communications, the systems and methods can be used with other types of wireless and wired data and communications system. In addition, while the various controls and buttons are generally shown as selectable buttons on a touchscreen for the end-points 102, these controls and buttons could easily be inputs from actual, physical button, voice commands, or other types of interfaces on the end-point 102 or associated with the end-point 102.

In addition, the location and configuration used for various features of examples of the present disclosure such as, for example, the order of the steps used, the components and layout of the GUIs 206, and other features can be varied according to a particular end-point or communications network, among other things. Such changes are intended to be embraced within the scope of this disclosure.

The specific configurations, machines, and the size and shape of various elements can be varied according to particular design specifications or constraints requiring a GUI, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
   receiving, at a subscription management application program interface (SMA) of an embedded subscriber identification module (eSIM) system, a notification indicating a firmware over-the-air (FOTA) update of an end-point;
   parsing, with the eSIM system, the notification into a first group of one or more functions associated with the end-point;
   based at least on the parsing, determining, with the eSIM system, that the first group of one or more functions includes at least one new function; and
   sending a first signal from the SMA to a subscription management module (SMM) to cause the SMM to send a second message to the end-point,
   wherein the second message causes the end-point to provide an output to request user input regarding acceptance of the at least one new function.

2. The method of claim 1, further comprising:
   receiving, at the SMA, a second signal from the SMM indicating user acceptance at an input of the end-point of the at least one new function;
   converting, with the eSIM system, the one or more functions into a first group of one or more profile attributes;
   sending a third signal from the SMA to the SMM requesting a list of profiles currently stored on the end-point;
   comparing, with the eSIM system, the first group of one or more profile attributes to the list of profiles; and
   determining, with the eSIM system, whether the first group of one or more profile attributes is included within profile attributes of at least one profile on the list of profiles.

3. The method of claim 2, wherein determining, with the eSIM system, whether the first group of one or more profile attributes is included within profile attributes of at least one profile on the list of profiles comprises determining that the first group of one or more profile attributes is included within profile attributes of a particular profile on the list of profiles, the method further comprising:
   sending a fourth signal from the SMA to the SMM to activate the particular profile on the end-point.

4. The method of claim 2, wherein determining, with the eSIM system, whether the first group of one or more profile attributes is included within profile attributes of at least one profile on the list of profiles comprises determining that the first group of one or more profile attributes is not included within profile attributes of any of the profiles on the list of profiles, the method further comprising:
   sending a fourth signal from the SMA to the SMM to prepare a new profile including profile attributes comprising at least the first group of one or more profile attributes.

5. The method of claim 2, further comprising:
   receiving, at the SMA, a fourth signal from the input of the end-point requesting a second group of one or more functions for the end-point;
   converting, with the eSIM system, the second group of one or more functions into a second group of one or more profile attributes;
   comparing, with the eSIM system, the second group of one or more profile attributes to the list of profiles; and
   determining, with the eSIM system, whether the second group of one or more profile attributes is included within profile attributes of at least one profile on the list of profiles,
   wherein the second group of profile attributes contains fewer profile attributes than the first group of profile attributes.

6. The method of claim 5, wherein determining, with the eSIM system, whether the second group of one or more profile attributes is included within profile attributes of at least one profile on the list of profiles comprises determining that the second group of one or more profile attributes is included within profile attributes of a particular profile on the list of profiles, the method further comprising:
   sending a fifth signal from the SMA to the SMM to activate the particular profile on the end-point.

7. The method of claim 5, wherein determining, with the eSIM system, whether the second group of one or more profile attributes is included within profile attributes of a particular profile on the list of profiles comprises determining that the second group of one or more profile attributes is not included within profile attributes of any of the profiles on the list of profiles, the method further comprising:
   sending a fifth signal from the SMA to the SMM to prepare a new profile comprising at least the second group of one or more profile attributes.

8. The method of claim 1, further comprising:
   based at least in part on the user input, receiving a signal indicating one of (i) acceptance of the at least one new function or (ii) rejection of the at least one new function.

9. A non-transitory computer-readable medium having stored thereon programming instructions which, when executed by a computing device, cause the computing device to perform operations comprising:
   receiving a notification indicating a firmware over-the-air (FOTA) update of an end-point;
   parsing the notification into a first group of one or more functions associated with the end-point;
   based at least on the parsing, determining that the first group of one or more functions includes at least one new function; and
   sending a first signal to a subscription management module (SMM) to cause the SMM to send a second message to the end-point,
   wherein the second message causes the end-point to provide an output to request user input regarding acceptance of the at least one new function.

10. The non-transitory computer-readable medium of claim 9, wherein the operations further comprise:
    receiving a second signal from the SMM indicating user acceptance at an input of the end-point of the at least one new function;
    converting the one or more functions into a first group of one or more profile attributes;
    sending a third signal to the SMM requesting a list of profiles currently stored on the end-point;
    comparing the first group of one or more profile attributes to the list of profiles; and
    determining whether the first group of one or more profile attributes is included within profile attributes of at least one profile on the list of profiles.

11. The non-transitory computer-readable medium of claim 10, wherein determining whether the first group of one or more profile attributes is included within profile attributes of at least one profile on the list of profiles comprises determining that the first group of one or more profile attributes is included within profile attributes of a particular profile on the list of profiles, the operations further comprising:
    sending a fourth signal to the SMM to activate the particular profile on the end-point.

12. The non-transitory computer-readable medium of claim 10, wherein determining whether the first group of one or more profile attributes is included within profile attributes of at least one profile on the list of profiles comprises determining that the first group of one or more profile attributes is not included within profile attributes of any of the profiles on the list of profiles, the operations further comprising:
    sending a fourth signal to the SMM to prepare a new profile comprising at least the first group of one or more profile attributes.

13. The non-transitory computer-readable medium of claim 10, wherein the operations further comprise
    receiving a fourth signal from the input of the end-point requesting a second group of one or more functions for the end-point;
    converting the second group of one or more functions into a second group of one or more profile attributes;
    comparing the second group of one or more profile attributes to the list of profiles; and
    determining whether the second group of one or more profile attributes is included within profile attributes of at least one profile on the list of profiles,
    wherein the second group of profile attributes contains fewer profile attributes than the first group of profile attributes.

14. The non-transitory computer-readable medium of claim 13, wherein determining whether the second group of one or more profile attributes is included within profile attributes of at least one profile on the list of profiles comprises determining that the second group of one or more profile attributes is included within profile attributes of a particular profile on the list of profiles, the operations further comprising:
    sending a fifth signal to the SMM to activate the particular profile on the end-point.

15. The non-transitory computer-readable medium of claim 13, wherein determining whether the second group of one or more profile attributes is included within profile attributes of at least one profile on the list of profiles comprises determining that the second group of one or more profile attributes is not included within profile attributes of any of the profiles on the list of profiles, the operations further comprising:
    sending a fifth signal to the SMM to prepare a new profile comprising at least the second group of one or more profile attributes.

* * * * *